United States Patent [19]

Ando et al.

[11] Patent Number: 4,555,849

[45] Date of Patent: Dec. 3, 1985

[54] BATTERY POWERED PORTABLE SAW

[75] Inventors: Hiroyuki Ando; Toshio Tanabe; Shinji Ihara, all of Hikone, Japan

[73] Assignee: Matsushita Electric Works, Ltd., Osaka, Japan

[21] Appl. No.: 504,064

[22] Filed: Jun. 14, 1983

[30] Foreign Application Priority Data

Jun. 21, 1982 [JP] Japan ................................ 57-106339

[51] Int. Cl.[4] ................................................ B23D 45/16
[52] U.S. Cl. ........................................... 30/388; 320/2
[58] Field of Search ................................. 30/388-391; 320/2

[56] References Cited

U.S. PATENT DOCUMENTS 3,623,518 11/1971 Nicotra ............................ 143/43 A
4,084,123 4/1978 Lineback et al. ....................... 320/2

FOREIGN PATENT DOCUMENTS 824256 12/1951 Fed. Rep. of Germany .
7156 2/1967 Japan .................................... 30/388

*Primary Examiner*—Douglas D. Watts
*Attorney, Agent, or Firm*—Stevens, Davis, Miller & Mosher

[57] ABSTRACT

A portable electric circular saw which operates on a rechargeable battery is disclosed. The circular saw comprises a housing for accommodating a motor driving a circular saw blade operatively connected thereto, the rechargeable battery supplying electricity to the motor, and a handle projecting atop the housing, the motor having an output shaft arranged transversely of the housing and connected to a drive spindle carrying the saw blade and arranged in parallel relationship with the output shaft. The motor and the battery are disposed within the housing, to be arranged along the cutting direction of the saw blade, so as to properly distribute the weight of the saw in the longitudinal direction, which is the cutting direction of the saw blade. The handle is of generally U-shaped configuration, having an elongated top grip and legs at opposed ends, which join the top of the housing at respective portions upwardly of the motor and the battery, with the top grip extended longitudinally along the cutting direction of the saw blade, such as to provide a properly balanced saw structure, which effectuates easy hand operation to advance the saw.

3 Claims, 8 Drawing Figures

BATTERY POWERED PORTABLE SAW

BACKGROUND OF THE DISCLOSURE

1. Field of the Invention

This invention relates to a portable electric circular saw, more particularly to an electric circular saw of the type being powered by a rechargeable battery incorporated therein.

2. Description of the Prior Art

Portable electric saws have been designed in the past with a fixed handle projected atop the housing in which the motor for driving a saw blade is accomodated, as disclosed in U.S. Pat. No. 3,056,439. However, saws of this type necessitate an AC power supply and, therefore, rely on a power cord which is to be plugged into a conventional household electrical outlet or an electrical outlet provided in an operation location, limiting the use of the saw to restricted locations where the power cord can reach an electrical outlet. Moreover, the power cord extending from the saw may cause inconvenience, such as the cord detracting from cutting operation of the saw or being inadvertantly cut by the saw blade in use. To eliminate the above inconvenience, a portable saw powered by an incorporated battery is desirable. The battery employed for this kind of saw requires a relatively high capacity to enable powerful sawing by the motor and thus is preferred to be a lead storage battery, as has been adapted to motor vehicles and the like. This lead storage battery is of heavy weight, however, and despite its advantageous nature of being rechargeable, would require a sturdy saw structure for the purpose of providing easy hand control of the sawing operation, so as to achieve balance of the whole saw device in the direction along which the lead storage battery and the motor are aligned, that is, lengthwise balance along a cutting line disposed in line therewith.

SUMMARY OF THE INVENTION

The present invention has been devised to provide an improved electric circular saw structure which is properly balanced for hand operation, while retaining the advantage of a rechargeable battery as a power source of the motor driving a saw blade. That is, a saw which is easily manipulated and has no power cord to worry about, as opposed to the prior electrical saws operating on an AC supply. The above advantages have been accomplished in the present invention by its novel structure, in which a rechargeable battery, together with a motor having a horizontal output rotor shaft, is arranged transversely of a housing and accommodated within the housing, such that the battery and the motor, both of heavy weight, are disposed in a plane parallel to the cutting plane of a circular saw blade. A handle projecting upwardly from the top of the housing is of generally downwardly disposed U-shaped configuration, the opposed legs of which join the housing at respective portions upwardly of the motor and the battery with an elongated top grip of the handle extending along said cutting direction. Accordingly, it is a primary object of the present invention to provide a portable electric circular saw of well balanced structure, which enables an operator to manipulate easily and smoothly so as to easily retain the saw in position upon a workpiece to be cut. Another object of the present invention is to provide a portable electric circular saw of simple construction, in which the handle is integrally formed with the housing accommodating the motor and the battery.

In addition to the above, the present invention also discloses another improved arrangement for the location of the motor within the housing relative to the saw blade, in which the output rotor shaft of the motor is connected through a speed reduction means to a drive spindle carrying the saw blade thereon and disposed in parallel relationship with the output shaft, such that the motor shaft is disposed forwardly of the drive spindle along the cutting direction. With this arrangement, the motor of heavy weight acts to lower the center of gravity of the whole saw device, together with the location of the handle, in such a way as to facilitate following a cutting line marked on the workpiece, as well as to reduce the rotational movement acting about the center of gravity of the whole saw device at the time of the cutting operation. Therefore, another object of the present invention is to provide a portable electric circular saw which is less susceptible to the influence of such rotational movement, due to the cutting resistance, than a saw with the output rotor shaft of the motor and the drive shaft of the saw blade being aligned in a vertical plane, such that there is less fluctuation of the saw when held by hand, and to attain easy control thereof during cutting operation.

These and other objects and advantages of the present invention will become more apparent from the detailed description thereof taken with the accompanying drawings.

DETAILED DESCRIPTION OF THE PREFERRED EMBODIMENT

Figure 1:
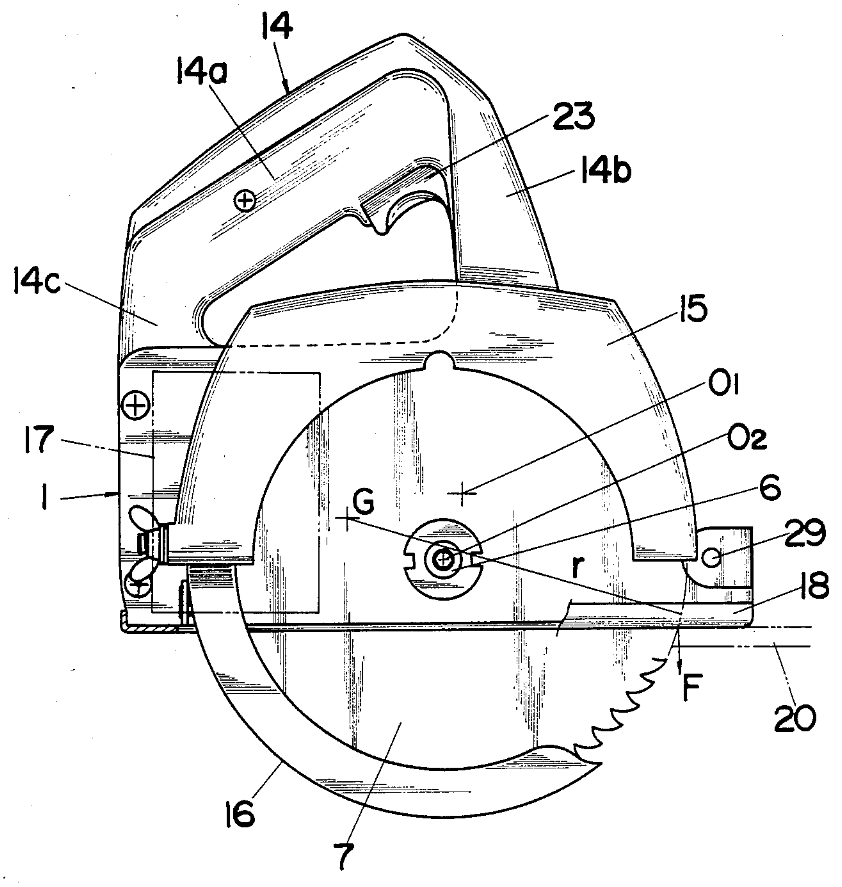
FIG. 1 is a side elevational view from the saw blade side of a portable electric circular saw embodying the present invention.
Figure 2:
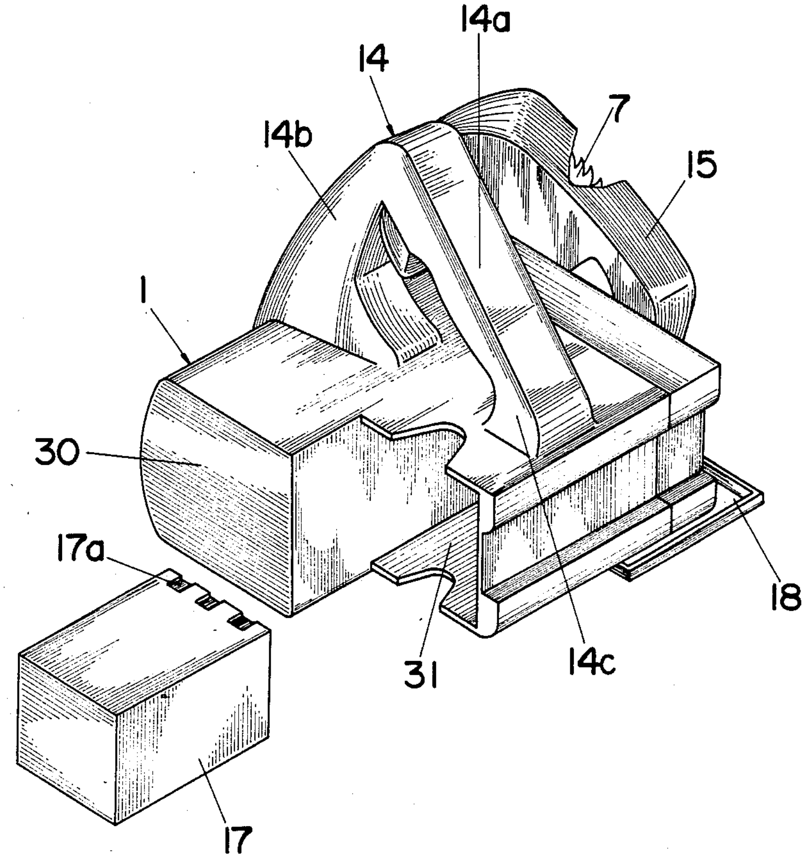
FIG. 2 is a perspective view from the rear left side of the electric circular saw and a rechargeable battery pack employed therein.
Figure 3:
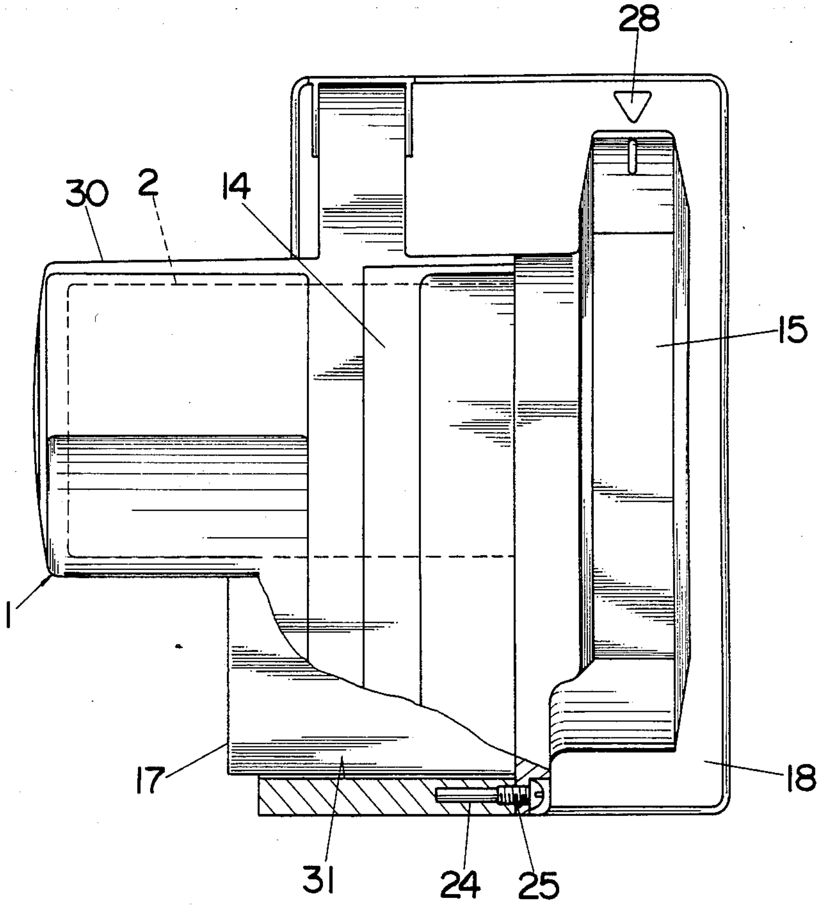
FIG. 3 is a plan view partly in section of the electric circular saw of this invention.
Figure 4:
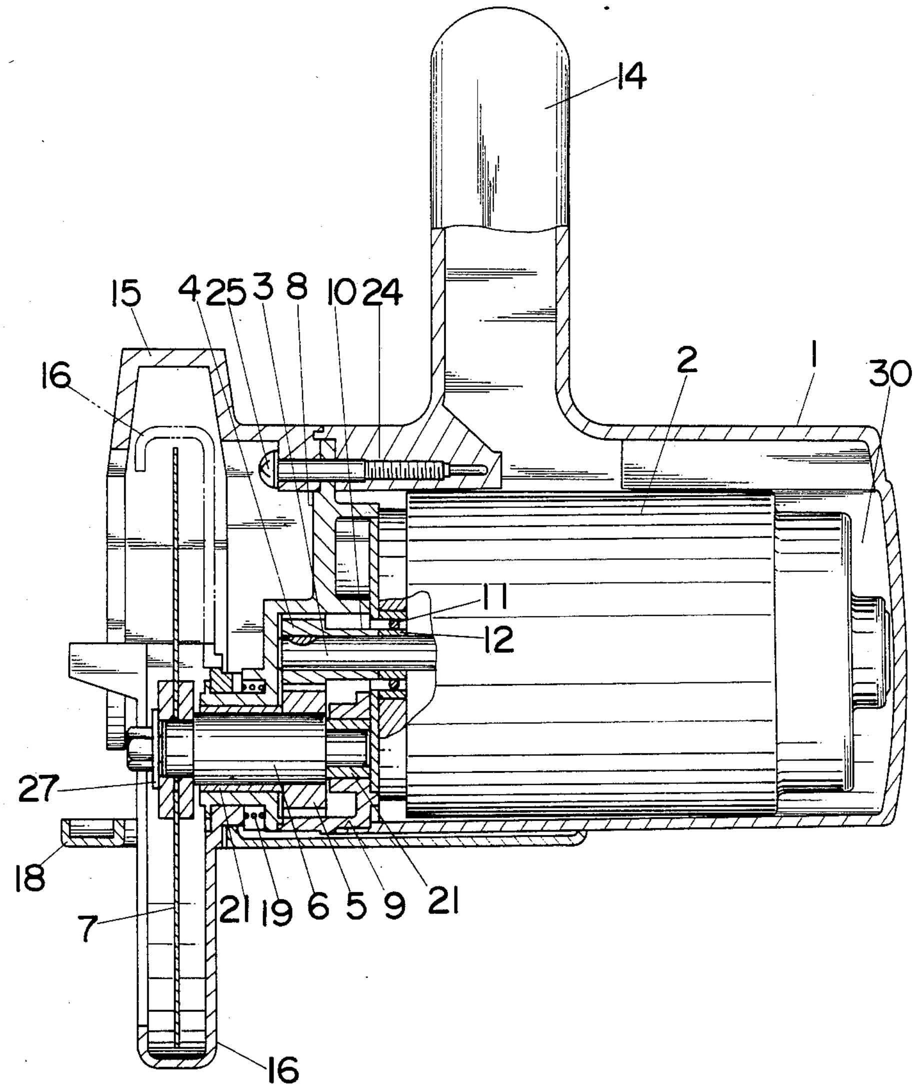
FIG. 4 is a broken-away front elevational view thereof.
Figure 5:
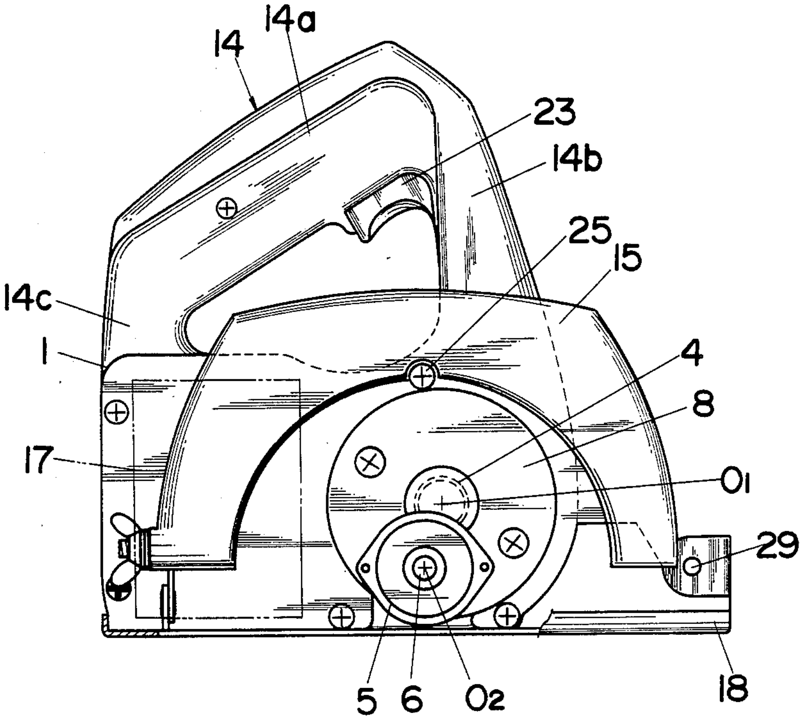
FIG. 5 is a side elevational view of the electric circular saw with the saw blade and the pivotal safety guard removed.
Figure 6:
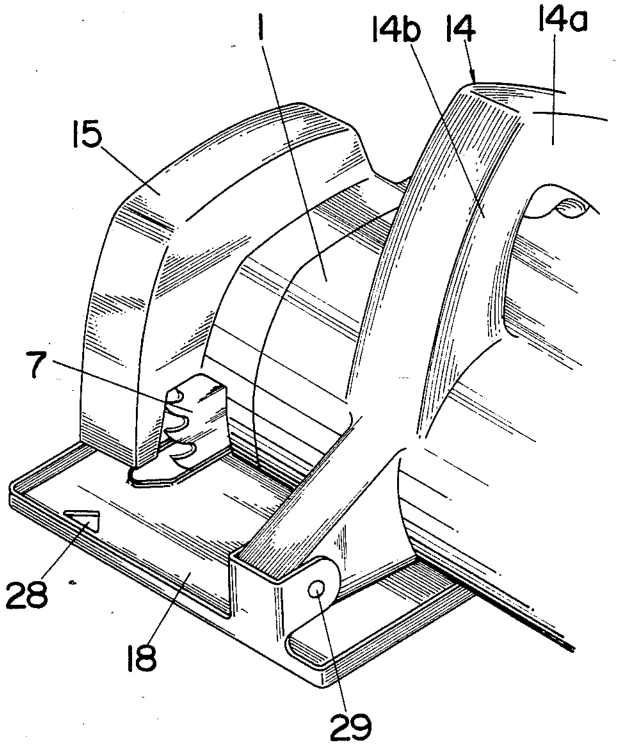
FIG. 6 is a partial perspective view showing the front portion of the electric circular saw.
Figure 7:
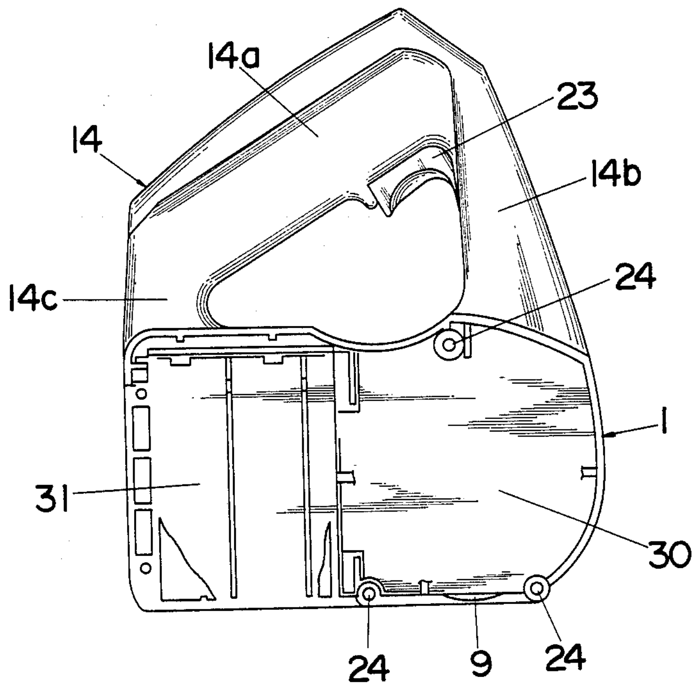
FIG. 7 is a side elevational view of a housing employed in the above electric circular saw.
Figure 8:
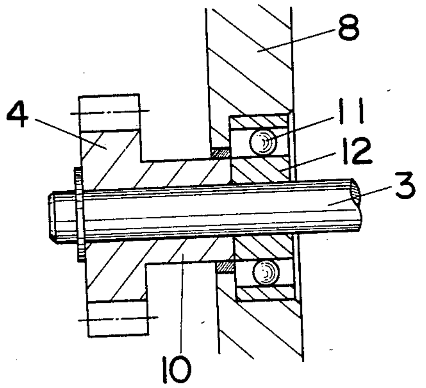
FIG. 8 is a fragmentary sectional view of the reduction gear employed as speed reduction means in this invention.

Referring now to the drawings, and particularly to FIGS. 1, 2 and 4, there is shown a portable electric circular saw embodying the present invention, which includes a housing 1 provided with a motor chamber 30 for accommodating a motor therein, a battery chamber 31 in which a rechargeable battery 17 is detachably received, and a handle 14 projecting upwardly from the top of the housing 1 and formed integrally therewith. Attached to the housing 1 are a fixed safety guard 15 secured within a saw blade compartment on one side of a generally vertical end wall of the housing 1 and a base 18 to support the electric saw upon a workpiece 20. The base 18, as shown in FIG. 6, is pivotally connected to the housing 1 by a pin 29 to allow vertical pivotal movement thereof relative to the housing 1 and is provided with a tracking mark 28 in the form of triangular perforation disposed forwardly of a circular saw blade 7, with the top of the triangle positioned in the plane of the saw blade 7. The output rotor shaft 3 of the motor 2 is connected to a drive spindle 6 carrying the circular saw blade 7 thereon, with both axes arranged transversely of the housing 1 to be in parallel relationship and drivingly connected with each other by means of reduction gears 4 and 5, constituting speed reduction means so as to rotate the saw blade 7 about the drive spindle 6. The reduction gear 4 has a concentric boss 10 projecting integrally therefrom, through which the output rotor shaft 3 extends and one end of which, as is best shown in FIG. 8, abuts against the inner race 12 of a ball bearing 11 supporting the output rotor shaft 3 at the portion between the motor 2 and the reduction gear 4, in such a way as to prevent the movement of the gear 4 in the axial direction without the necessity of providing the shaft 3 with any projection or notch which would be subject to stress concentration. These reduction gears 4 and 5 are enclosed in a gear casing 8 which is secured to the housing 1 to close the side opening of the motor chamber 30 and in which the drive spindle 6 is journaled at its opposite ends by respective bearing sleeves 21 and retained in position by a retaining ring 27, the gear casing 8 being secured to the housing by screws 25 engaged with tapped holes 24 in the housing 1. A pivotal safety guard 16 is pivotally connected to the gear casing 8 so as to pivot about the axis of the drive spindle 6 and is urged by a spring 19 in the direction of covering the lower periphery of the saw blade 7. The rechargeable battery 17 comprising a lead storage battery in the form of a battery pack to be snapped in and out from a sidewardly open battery chamber which is disposed rearwardly of the motor chamber 30 along the cutting line of the saw blade 7, preferably in the longitudinal direction of the saw. This battery pack 17 is provided with terminals 17*a* which are to be electrically connected, when snapped in the battery chamber 31, to the motor 2 through a trigger switch 23 mounted on the upper portion of the handle 14. The rechargeable battery pack 17, due to its being a lead storage battery, is of a weight heavier than the motor 2. Said handle 14 is of generally downwardly disposed U-shaped configuration having a longitudinally elongated top grip 14*a* and legs 14*b*, 14*c* extending downwardly from the opposite ends thereof. This handle 14 is formed integrally with the housing 1 and extends upwardly therefrom, with the forward leg 14*b* joined to the housing 1 at a portion above the motor chamber 30 and the rearward leg 14*c* is joined at a portion above the battery chamber 31 to bridge between these two longitudinally disposed chambers 30 and 31, in such a way as to support the saw nearly in balance, as well as to place the grip 14*a* along the longitudinal direction or the cutting direction of the saw blade 7, whereby, during a cutting operation to advance the saw with its base 18 rested on the surface of the workpiece 20, the saw can be easily manipulated upon grasping and applying a lengthwise force to the grip 14*a*. The output rotor shaft 3 of the motor 2 and the drive spindle 6 carrying the saw blade 7, both of which preferably have respective horizontal axes parallel with each other, are arranged such that the motor shaft is disposed forwardly and upwardly of the drive spindle. With this arrangement, as shown in FIG. 1, the centers of the output rotor shaft 3 and the drive spindle 6 are indicated respectively by $O_1$ and $O_2$. The center $O_1$ of the output rotor shaft 3 of the motor 2 is positioned at a lower location that if the output shaft 3 and the drive spindle 6 were aligned in a vertical line, because of the fact that there is a required constant distance between the output shaft 3 and the drive spindle 6 for the reduction gears 4 and 5, thus contributing to lower the center G of gravity of the saw as well as to lower the positioning of the handle 14. Further, with this arrangement of the output rotor shaft 3 being disposed forwardly of the drive spindle 6, the motor 2 of relatively heavy weight serves to move the center G of gravity of the whole saw nearer to the leading edge of the saw blade 7, which contacts the workpiece 20. This configuration achieves the shortest distance r between the leading edge of the saw blade 7 and the center G of gravity of the whole saw than would be the case where the output shaft 3 and drive spindle 6 are in vertical alignment, reducing the torque, or rotational movement produced due to the cutting resistance F produced by the workpiece 20 and acting to rotate the saw about its center G of gravity. As illustrated in FIG. 7, the housing 1 has in its inner surface of the bottom wall (defining the bottom of the motor chamber 30) a recess 9 having a thin wall which is a cutout portion for receiving the bottom portion of the gear casing 8. The gear casing 8 itself has a relatively thick wall, such as to assure good mechanical strength. The result is that the recess 9 serves to bring the integrally strong gear casing 8 down near to the bottom of the housing 1, together with the motor 2 which is spaced apart therefrom at a fixed distance, as previously discussed. The result is to increase the depth of cut, since the depth corresponds to the vertical dimension from the undersurface of the base 18 to the lowermost periphery of the saw blade 7, and, at the same time, to lower the center G of gravity of the saw. In addition to the above, this arrangement places the axis of the output rotor shaft 3 forwardly of the drive spindle 6.

The above description, and particularly the drawings, are set forth for purposes of illustration only. It will be understood that many variations and modifications of the embodiment herein described will be obvious to those skilled in the art, and may be carried out without departing from the spirit and scope of the invention.

We claim:

1. A battery powered portable electric circular saw having improved balance, comprising:

a housing having a generally vertical end wall defining a parallel saw blade compartment on one side thereof and a saw blade drive spindle rotatably supported to extend through said vertical wall;

a battery chamber and a motor chamber defined in said housing on the other side of said vertical end wall, an electric motor in said motor chamber having its output shaft generally perpendicular to said vertical end wall, with the center of said shaft being forward and above the center of said drive spindle in relation to the advancing direction of the saw blade;

gear reduction means drivingly interconnecting said motor output shaft and said drive spindle;

said battery chamber and said motor chamber lying side-by-side and generally in alignment with each other so as to be mutually parallel and perpendicular to said vertical end wall so as to achieve balance of weight between the front and rear of said saw, with the front-to-back center of gravity being slightly to the rear of said saw blade drive spindle;

a base for contacting the material to be cut and pivot means comprising a pin and a round holder for vertical movement of the saw relative to the base to adjust the depth of the saw cut, said pivot means being located forward of the saw blade in relation to the advancing direction of the saw blade; and an inverted C-shaped handle mounted above and bridging over said battery chamber and said motor chamber, said handle having an elongated top grip lying generally parallel to the cutting direction of the saw.

2. The portable electric circular saw as set forth in claim 1, wherein said handle is formed integrally with the housing.

3. The portable electric circular saw as set forth in claim 1, wherein said speed reduction means comprises reduction gears and a gear casing accommodating the same, and wherein said housing includes a bottom wall formed with a recess into which the lower portion of the gear casing is received.

* * * * *